United States Patent
Day

(10) Patent No.: US 7,452,019 B1
(45) Date of Patent: Nov. 18, 2008

(54) SLIDING AND STOWING MOTOR VEHICLE SEAT

(75) Inventor: Robert Christopher Day, Whitmore Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/758,461

(22) Filed: Jun. 5, 2007

(51) Int. Cl.
*B60N 2/12* (2006.01)
(52) U.S. Cl. .................. 296/65.16; 296/66; 297/15; 297/344.13
(58) Field of Classification Search .............. 296/63, 296/66, 65.01, 65.16, 69; 297/15, 344.13
See application file for complete search history.

(56) References Cited

U.S. PATENT DOCUMENTS

| | | | |
|---|---|---|---|
| 1,062,010 A * | 5/1913 | Jacobson | 297/46 |
| 5,839,773 A | 11/1998 | Ban et al. | |
| 5,868,451 A | 2/1999 | Uno et al. | |
| 6,279,982 B1 | 8/2001 | Nishimura et al. | |
| 6,955,386 B2 | 10/2005 | Rhodes et al. | |
| 6,997,498 B2 * | 2/2006 | Oyama | 296/65.05 |
| 7,128,358 B2 | 10/2006 | Perin | |
| 2004/0100114 A1 | 5/2004 | Rhodes et al. | |
| 2006/0097538 A1 | 5/2006 | Villeminey | |
| 2006/0181113 A1 | 8/2006 | Perin | |

FOREIGN PATENT DOCUMENTS

| | | |
|---|---|---|
| CA | 2438023 | 2/2004 |
| JP | 07164942 | 6/1995 |
| JP | 09207637 | 8/1997 |
| JP | 2003252089 | 9/2003 |
| JP | 2005247318 | 9/2005 |
| JP | 2005297834 | 10/2005 |
| WO | WO-/03078201 | 9/2003 |
| WO | WO-2004037602 | 5/2004 |
| WO | WO-2006/052460 | 5/2006 |

* cited by examiner

*Primary Examiner*—Joseph D Pape
(74) *Attorney, Agent, or Firm*—Gifford, Krass, Sprinkle, Anderson & Citkowski, P.C.

(57) ABSTRACT

A vehicle includes a seat assembly for supporting an occupant above a floor and an adjustment mechanism providing generally horizontal movement of the seat assembly relative to the floor and substantially vertical movement of the seat assembly through an opening in the floor between a use position extending above the floor and a stowed position disposed in a storage space beneath the floor.

20 Claims, 3 Drawing Sheets

SLIDING AND STOWING MOTOR VEHICLE SEAT

FIELD OF THE INVENTION

The invention relates to motor vehicles and seat assemblies for use in motor vehicles. More particularly, the invention relates to motor vehicle and a seat assembly for use in the motor vehicle, which is movable in a generally horizontal direction along an upper surface of a floor in the vehicle and in a substantially vertical direction between a use position disposed above the floor and a stowed position disposed in storage space below the floor.

BACKGROUND OF THE INVENTION

Motor vehicles include seat assemblies for supporting occupants above a floor in a passenger compartment of the vehicle. It is known to provide seat assemblies that are selectively movable or adjustable in a generally horizontal direction along an upper surface of the floor to accommodate occupants of varying heights or cargo of varying dimensions. It is also known to provide seat assemblies that pivot or flip into a recessed storage space located beneath the upper surface of the floor to expand the cargo carrying capacity in the passenger compartment. Such designs, however, are difficult for some users, since the seat assembly must be lifted as it is pivoted or flipped. Further, such designs are not easily implemented in vehicles where packaging space is limited, since the seat assemblies must have room to pivot or flip.

Thus, it remains desirable to provide an improved seat assembly that allows generally horizontal adjustment along the floor of the vehicle and is substantially vertically displaceable to a stowed position disposed in a storage space below the floor without pivoting or flipping.

SUMMARY OF THE INVENTION

According to one aspect of the invention, a vehicle includes a floor having an opening and a retractable floor shaped to substantially fill the opening. The vehicle includes a storage space disposed beneath the floor and below the opening. The vehicle also includes a seat assembly supported on the retractable floor. An adjustment mechanism provides generally horizontal adjustment of the seat assembly along at least the retractable floor and substantially vertical movement of the seat assembly through the opening between a use position disposed above the floor and a stowed position disposed in the storage space beneath the floor.

According to another aspect of the invention, a vehicle includes a floor having an opening and a retractable floor shaped to substantially fill the opening. The vehicle includes a storage space disposed beneath the floor and below the opening. The vehicle also includes a seat assembly supported on the retractable floor. The seat assembly has a generally horizontal seat cushion. The seat assembly has a seat back movable between a generally upright support position for supporting the back of an occupant seated on the seat cushion and a generally horizontal folded position overlying the seat cushion. An adjustment mechanism provides generally horizontal adjustment of the seat assembly along the retractable floor and substantially vertical movement of the seat assembly through the opening between a use position disposed above the floor and a stowed position disposed in the storage space beneath the floor. The seat back and seat cushion remain generally horizontal throughout the movement of the seat assembly between the use position and the stowed position.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
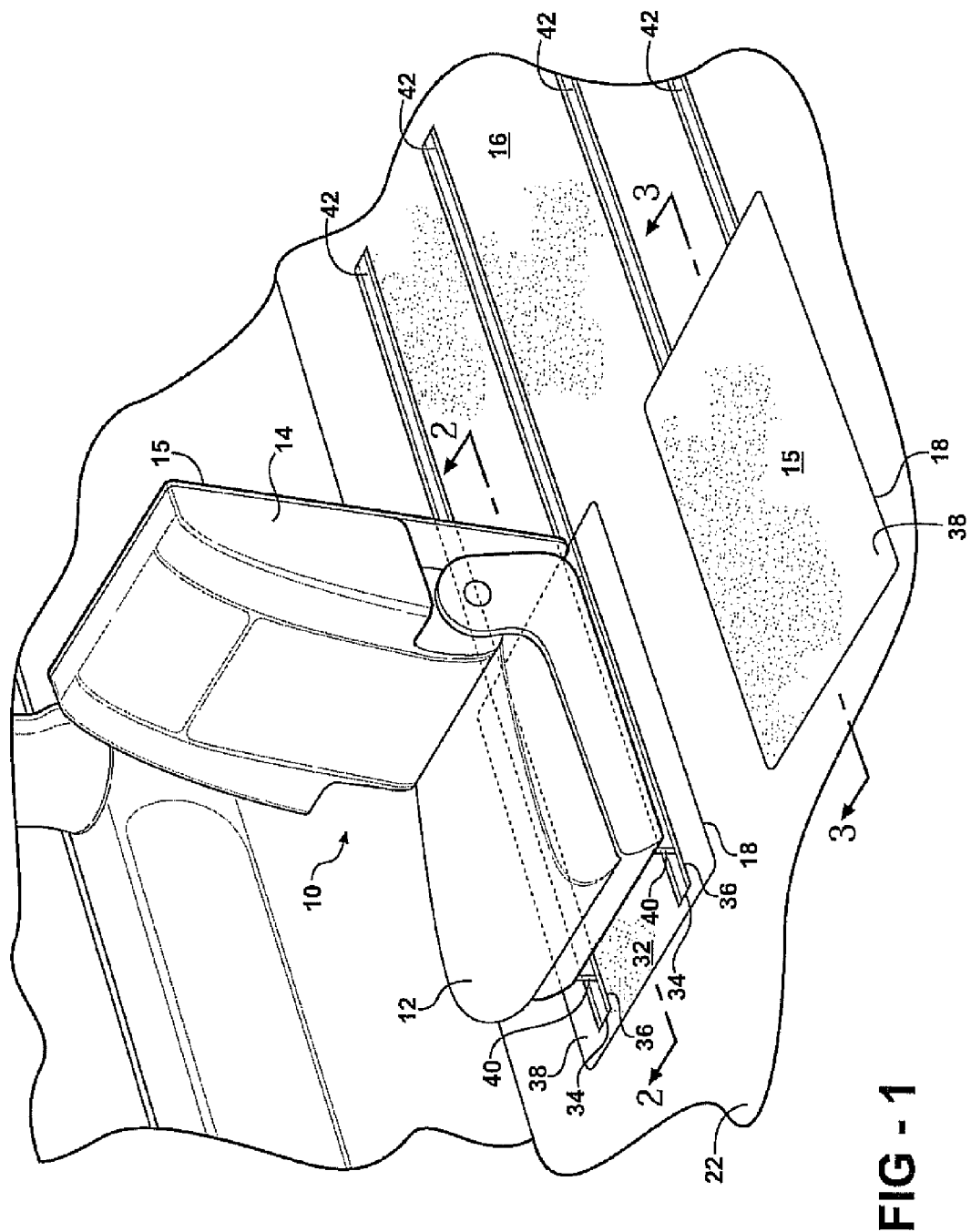
FIG. 1 is a perspective view of a passenger compartment in a motor vehicle and a seat assembly for use in the motor vehicle according to one embodiment of the invention.
Figure 2:
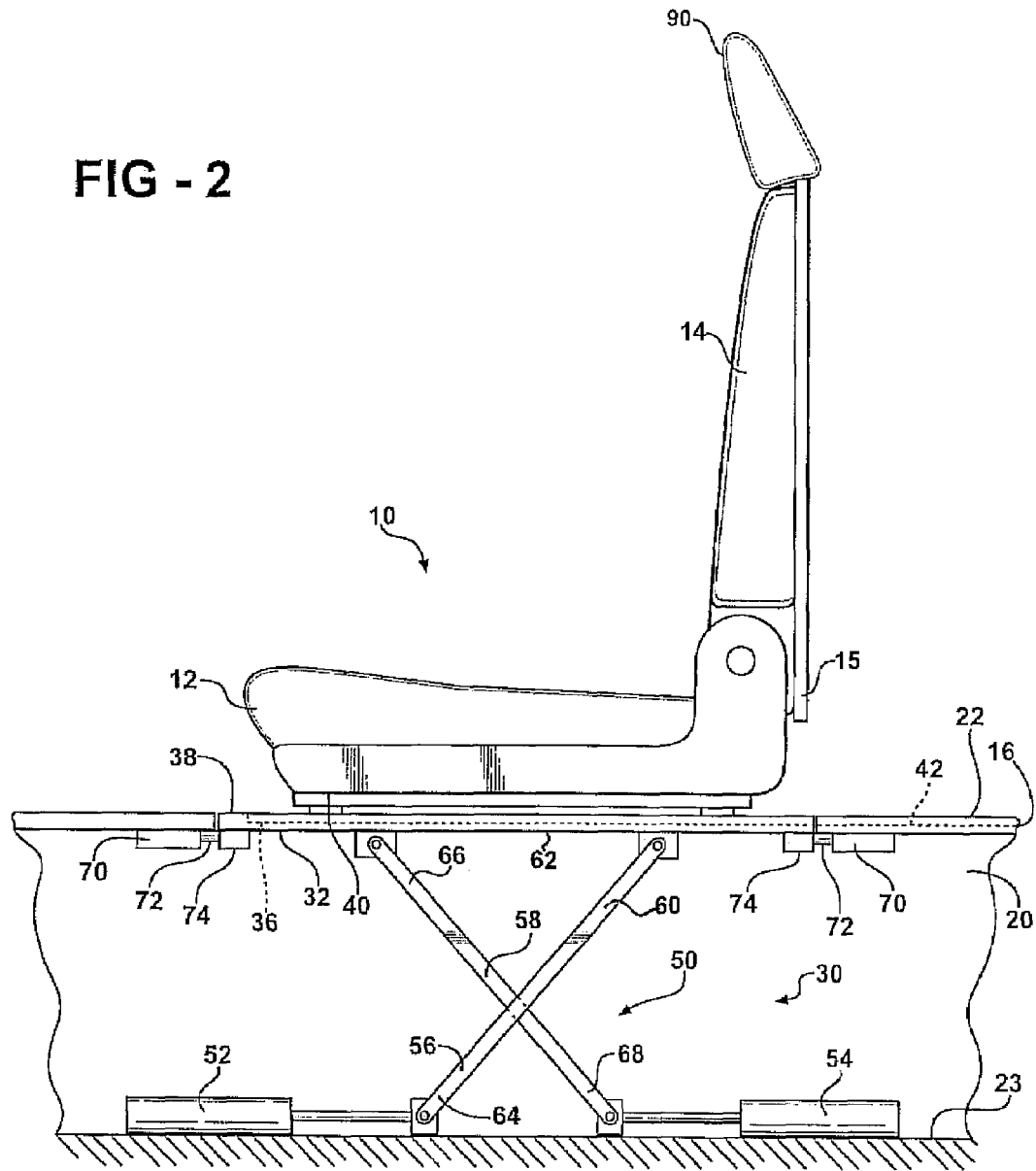
FIG. 2 is a side elevational view of the seat assembly in a use position to support an occupant above a floor in the vehicle.
Figure 3:
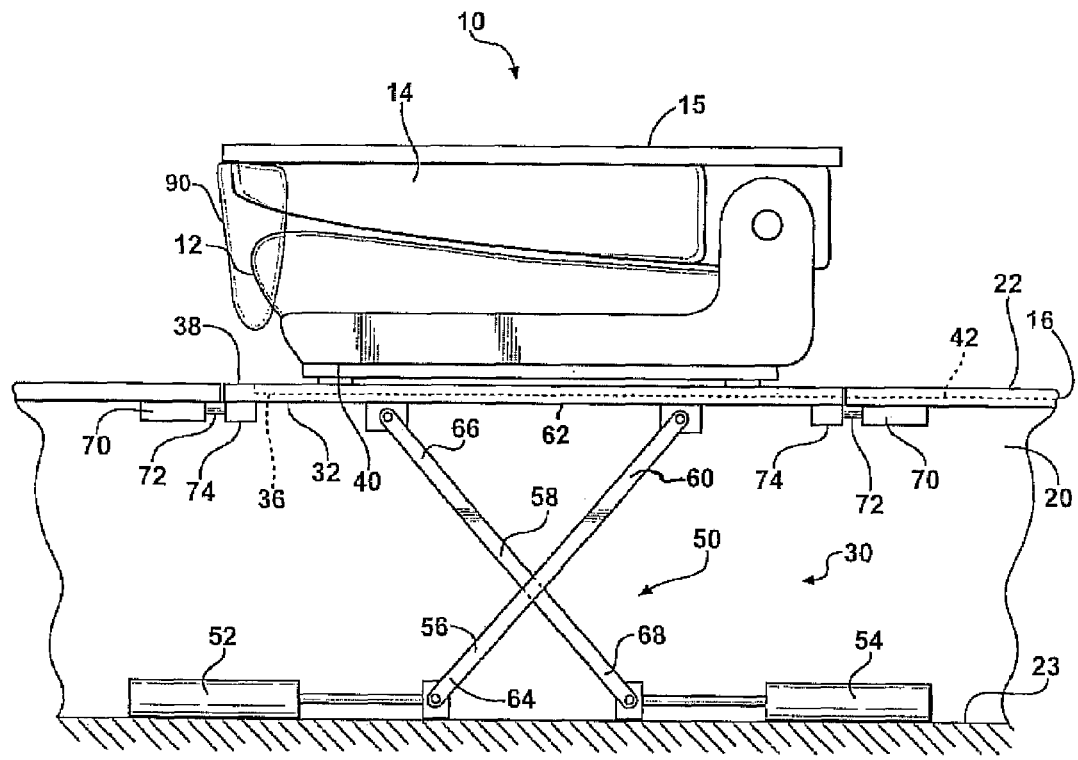
FIG. 3 is a side elevational view of the seat assembly with a seat back in a folded position overlying a seat cushion.

Referring to the figures, a seat assembly for use in a motor vehicle is generally indicated at 10. The seat assembly 10 includes a seat cushion 12 and a seat back 14 for supporting the back of an occupant seated on the seat cushion 12. The seat back 14 is pivotally coupled to the seat cushion 12 by a recliner mechanism (not shown) for movement between a generally upright support position, as shown in FIG. 2, and a generally horizontal, folded position overlying the seat cushion, as shown in FIG. 3. The vehicle includes a floor 16 having an opening 18 that leads to a recessed storage space 20, which is located below an upper surface 22 of the floor 16. Described in greater detail below, the seat assembly 10 includes an adjustment mechanism that allows both generally horizontal adjustment of the seat assembly 10 along the upper surface 22 of the floor 16 and substantially vertical displacement of the seat assembly 10 between a use position disposed above the upper surface 22 of the floor 16 and a stowed position disposed in the storage space 20.

The adjustment mechanism, which is indicated at 30 in the figures, interconnects the seat assembly 10 to a bottom wall 23 in the storage space 20. The adjustment mechanism 30 includes a retractable floor 32 having a shape and size corresponding with the opening 18 in the floor 16. In the illustrated embodiment, the shape of the opening 18 and retractable floor 32 are rectangular, though other shapes may be used depending on the application and particular requirements of the motor vehicle. The retractable floor 32 substantially covers the opening 18 and has an upper surface 38 that is substantially flush with the upper surface 22 of the floor 16 when the seat assembly 10 is in the use position. The adjustment mechanism 30 includes at least one track 34 interconnecting the seat cushion 12 to the retractable floor 32. In the illustrated embodiment, a generally parallel and spaced apart pair of tracks 34 interconnects the seat cushion 12 to the retractable floor 32. The track 34 includes a lower rail 36 fixedly secured to the retractable floor 32. The track 34 also includes an upper rail 40 fixedly secured to the seat cushion 12. The upper rail 40 is slidably coupled to the lower rail 36 and allows selective generally horizontal adjustment of the seat assembly 10 along the upper surfaces 22, 38 of the floor 16 and retractable floor 32. Extensions 42 of the lower rail 36 may be provided on the floor 16 to extend the range of movement of the upper rail 40 beyond one or opposite sides of retractable floor 32. In the illustrated embodiment, the track 34 extends longitudinally in a generally fore and aft direction in the vehicle. It should be appreciated by those skilled in the art that other longitudinal orientations of the track along the floor may be used depending on the application or particular requirements of the motor vehicle.

The adjustment mechanism 30 includes a vertical adjuster 50 that allows the substantially vertical adjustment of the seat assembly 10 between the use and stowed positions. A variety of vertical adjuster designs or lift mechanisms may be used for vertically displacing the seat assembly between the use and stowed positions. In the illustrated embodiment, the vertical adjuster 50 includes a first actuator 52 and a second actuator 54 for driving the seat assembly 10 between the use and stowed positions. Illustratively, the vertical adjuster 50 a multi-link mechanism operatively couples the actuators 52, 54 to the retractable floor 32 to cause vertical displacement of the retractable floor 32 in response to actuation of the actuators 52, 54. The multi-link mechanism includes a pair of first link 56 and a pair of second links 58. The first links 56 are generally parallel with each other. Each first link 56 includes a first end 60 pivotally coupled to a bottom surface 62 of the retractable floor 32 and an opposite second end 64 pivotally coupled to the first actuator 52. The second links 58 are also generally parallel with each other. Each second link 58 includes a first end 66 pivotally coupled to the bottom surface 62 of the retractable floor 32 and an opposite second end 68 pivotally coupled to the second actuator 54. A bracket may be used for interconnecting the second ends of the links to the respective actuators. Alternatively, an actuator may be provided for each link. The actuators may be of any suitable type known by those having ordinary skill in the art, such as hydraulic cylinders or electric motors. Other multi-link mechanisms may be used, depending on the specific requirements of a particular vehicle application.

The first ends 60 of the first links 56 and the first ends 66 of the second links 58 are pivotally coupled to generally opposite ends of the retractable floor 32. The first links 56 and second links 58 extend in a generally crosswise manner relative to each other. The first 52 and second 54 actuators extend generally horizontally along the bottom wall 23 in the storage space 20. The first 52 and second 54 actuators also oppose each other so that the second ends 64 of the first links 56 and the second ends 68 of the second links 58 are displaced toward and away from each other as the actuators 52, 54 are lengthened and shortened, respectively.

The seat back 14 includes a rigid back panel 15 that fills the opening 18 in the floor 16 when the seat back 14 is folded and the seat assembly 10 is in the stowed position disposed in the storage space 20. That back panel 15 may be provided in substantially the same material, texture and color as the floor 16.

A latch mechanism 70 is coupled to the floor 16 for locking the seat assembly 10 in the use position. Illustratively, a lock pin 72 is movable to a locked position engaged through a receiver 74 on the retractable floor 32. The pin 72 may be actuated between locked and unlocked positions either manually or with a powered actuator. Alternatively, the latch mechanism may be supported on the retractable floor, such that the pin lockingly engages a receiver on the floor. Alternatively, the latch mechanism may be actuated to automatically lock and unlock in response to movement of the seat back between the use position and folded position, respectively. For example, a bowden cable may be used to translate the pivotal movement of the seat back into displacement of the lock pin. It should also be appreciated that other types of latch mechanisms may be used. For example, a pivoting hook may be used instead of the illustrated pin for cinching and latching onto a closed loop receiver or pin-like striker.

Figure 4:
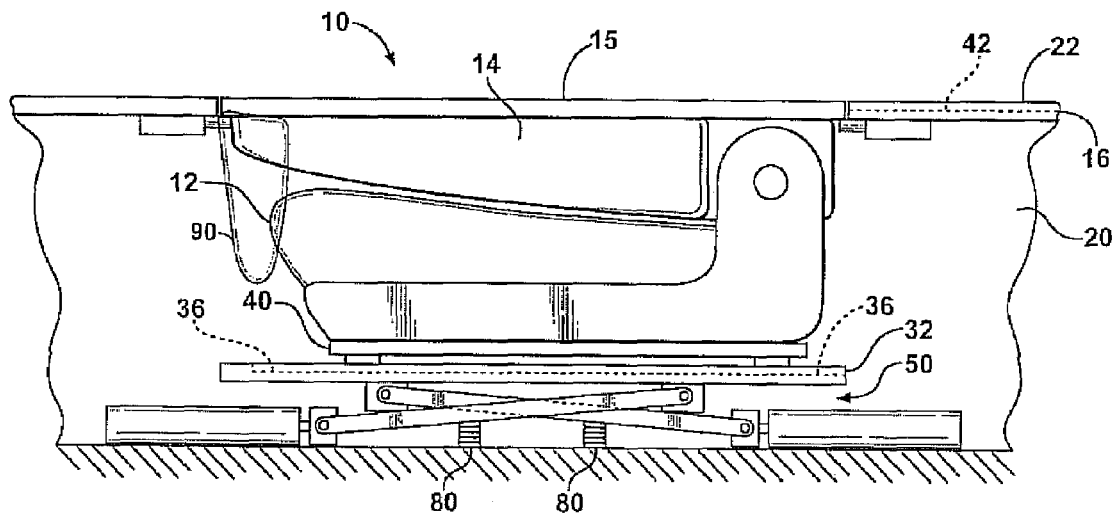
FIG. 4 is a side elevational view of the seat assembly in a stowed position disposed below the floor in the vehicle.

In use, the seat assembly 10 in the use position, shown in FIG. 2, can support an occupant above the floor 16 in the vehicle. To move the seat assembly 10 to the stowed position, the latch mechanisms 70 are unlocked. The seat back 14 is then pivoted to the folded position overlying the seat cushion 12, as shown in FIG. 3. Once the seat back 14 is in the folded position, the vertical adjuster 50 can be actuated to lower the retractable floor 32 and seat assembly 10 to the stowed position disposed in the storage space 20 below the floor 16, as shown in FIG. 4. In this position, the back panel 15 fills the opening 18 and is substantially flush with the floor 16 to provide a generally continuous cargo supporting surface therewith. The seat assembly 10 can be returned to the use position by reversing these aforementioned steps. As illustrated in FIG. 4, an assist 80 may be provided for assisting the vertical adjuster 50 when returning the seat assembly 10 to the use position.

Optionally, the recliner mechanism may allow movement of the seat back 14 between any one of a plurality of reclined support positions and the folded position. The recliner mechanism may be of any suitable type known by those skilled in the art, such as a continuously engaged rotary design that is manually driven or powered, or a manually actuated sector and pawl design.

Optionally, a control device may be used for automatically actuating the vertical adjuster 50 in response to movement of the seat back to the folded position. For example, the control device may be pre-programmed to automatically actuate the vertical adjuster 50 and move the seat assembly 10 from the use position to the stowed position in response to movement of the seat back 14 to the folded position.

Optionally, a head restraint 90 may be provided at the top of the seat back 14 for supporting the head of an occupant seated on the seat cushion 12. The head restraint 90 may be foldable or collapsible so as to not interfere with the cushion when the seat back 14 is folded and/or not interfere with the floor 16 as the seat assembly 10 is moved to the stowed position. Optionally, the head restraint 90 may be integral with the seat back 14. In this case, the opening 18 in the floor, the retractable floor 32 and the rigid back panel 15 would be extended accordingly to accommodate the shape of the head restraint 90. Similar arrangements can be made for a folding armrest.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A vehicle comprising:
a floor having an opening;
a retractable floor shaped to substantially fill the opening;
a storage space disposed beneath the floor and below the opening;
a seat assembly supported on the retractable floor; and
an adjustment mechanism providing generally horizontal adjustment of the seat assembly along the retractable floor and substantially vertical movement of the seat assembly through the opening between a use position disposed above the floor and a stowed position disposed in the storage space beneath the floor.

2. A vehicle as set forth in claim 1, wherein the adjustment mechanism allows generally horizontal adjustment of the seat assembly along both the floor in the vehicle and the retractable floor.

3. A vehicle as set forth in claim 1, wherein the adjustment mechanism includes a track mechanism having an upper rail coupled to the seat assembly and a lower rail coupled to the retractable floor, the upper rail and lower rail being slidably coupled to each other to allow the generally horizontal adjustment of the seat assembly along at least the retractable floor.

4. A vehicle as set forth in claim 3, wherein the adjustment mechanism includes a lower rail extension on the floor of the vehicle providing generally horizontal adjustment of the seat assembly along the floor of the vehicle and the retractable floor.

5. A vehicle as set forth in claim 1, wherein the adjustment mechanism includes a vertical adjuster having an actuator for driving the seat assembly between the use and stowed positions.

6. A vehicle as set forth in claim 5, wherein the vertical adjuster includes a first link and a second link interconnecting the retractable floor to the vehicle, each link having a first end pivotally coupled to the retractable floor and an opposite second end pivotally coupled to the vehicle.

7. A vehicle as set forth in claim 6, wherein the vertical adjuster includes first and second actuators for driving the first and second links, respectively.

8. A vehicle as set forth in claim 7, wherein the actuators are linear actuators.

9. A vehicle as set forth in claim 3, wherein the second ends of the links are pivotally coupled to respective first and second actuators, such that lengthening and shortening of the actuators causes the second ends to move toward and apart from each other and, in turn, causes displacement of the seat assembly between the use and stowed positions, respectively.

10. A vehicle as set forth in claim 5, wherein the actuators are hydraulic cylinders.

11. A vehicle as set forth in claim 1, wherein the seat assembly includes a seat cushion for supporting an occupant above the floor when the seat assembly is in the use position, the seat assembly further having a seat back for supporting the back of an occupant seated on the seat cushion.

12. A vehicle as set forth in claim 11, wherein the seat back is pivotally coupled to the seat cushion for movement between a generally upright seating position and a folded position overlying the seat cushion.

13. A vehicle as set forth in claim 12, wherein the seat back includes a back panel that substantially fills the opening in the floor of the vehicle when the seat assembly is in the stowed position and the seat back is in the folded position.

14. A vehicle as set forth in claim 13, wherein the back panel is substantially flush with the floor in the vehicle when the seat assembly is in the stowed position and the seat back is in the folded position.

15. A vehicle as set forth in claim 1, wherein the seat cushion remains substantially below the seat back and above the retractable floor throughout movement of the seat assembly between the use and stowed positions.

16. A vehicle as set forth in claim 1, wherein the seat cushion remains generally horizontal throughout movement of the seat assembly between the use and stowed positions.

17. A vehicle as set forth in claim 16, wherein the seat back remains generally horizontal in the folded position throughout movement of the seat assembly between the use and stowed positions.

18. A vehicle as forth in claim 1 including a latch mechanism that maintains the seat assembly in the use position by releasably interlocking the retractable floor to the floor in the vehicle.

19. A vehicle as set forth in claim 18, wherein the latch mechanism is actuated between locked and unlocked positions in response to movement of the seat back between a generally upright seating position and a folded position overlying the seat cushion.

20. A vehicle comprising:
a floor having an opening;
a retractable floor shaped to substantially fill the opening;
a storage space disposed beneath the floor and below the opening;
a seat assembly supported on the retractable floor, the seat assembly having a generally horizontal seat cushion, the seat assembly having a seat back movable between a generally upright support position for supporting the back of an occupant seated on the seat cushion and a generally horizontal folded position overlying the seat cushion; and
an adjustment mechanism providing generally horizontal adjustment of the seat assembly along the retractable floor and substantially vertical movement of the seat assembly through the opening between a use position disposed above the floor and a stowed position disposed in the storage space beneath the floor,
wherein the seat back and seat cushion remain generally horizontal throughout the movement of the seat assembly between the use position and the stowed position.

* * * * *

UNITED STATES PATENT AND TRADEMARK OFFICE
CERTIFICATE OF CORRECTION

| | | |
|---|---|---|
| PATENT NO. | : 7,452,019 B1 | Page 1 of 1 |
| APPLICATION NO. | : 11/758461 | |
| DATED | : November 18, 2008 | |
| INVENTOR(S) | : Robert Christopher Day | |

It is certified that error appears in the above-identified patent and that said Letters Patent is hereby corrected as shown below:

Column 3, line 17, replace "link" with --links--

Signed and Sealed this

Twenty-fourth Day of March, 2009

JOHN DOLL
*Acting Director of the United States Patent and Trademark Office*